United States Patent [19]
Thielemann, Jr.

[11] 3,816,863
[45] June 18, 1974

[54] MULTIPURPOSE SKI TOOL
[76] Inventor: Rudolf H. Thielemann, Jr., P.O. Box 43, Sweet Home, Oreg. 97386
[22] Filed: Nov. 29, 1972
[21] Appl. No.: 310,601

Related U.S. Application Data
[63] Continuation-in-part of Ser. No. 156,012, Aug. 25, 1971, abandoned.

[52] U.S. Cl. ............... 7/1 R, 30/172, 15/236 R
[51] Int. Cl. ............................... B25f 1/00
[58] Field of Search ...... 30/169, 172; 7/1 F, 14.1 A, 7/1 R; 15/105, 236 R; 145/50 C

[56] References Cited
UNITED STATES PATENTS
| | | | |
|---|---|---|---|
| 1,277,290 | 8/1918 | Campbell | 145/50 C |
| 2,277,528 | 3/1942 | Osborn | 15/236 R |
| 2,860,858 | 11/1958 | Kurs | 30/169 |

FOREIGN PATENTS OR APPLICATIONS
| | | | |
|---|---|---|---|
| 53,045 | 9/1933 | Norway | 15/236 R |
| 463,503 | 3/1950 | Canada | 15/236 R |
| 923,263 | 7/1947 | France | 145/50 C |

*Primary Examiner*—Al Lawrence Smith
*Assistant Examiner*—Roscoe V. Parker
*Attorney, Agent, or Firm*—Eugene M. Eckelman

[57] ABSTRACT

A tool having a plastic body portion with side metal edges and a metal tip. The tip and the side metal edges are shaped to be usable as a screwdriver. The side metal edges can also be used as a scraper. The body portion at the end opposite from the tip comprises a scraping edge. This latter edge is a part of the plastic body and can be used to scrape surfaces which metal may damage. The body portion is constructed of resin or plastic for structural and handling purposes.

2 Claims, 3 Drawing Figures

MULTIPURPOSE SKI TOOL

CROSS REFERENCE TO RELATED APPLICATION

This application is a continuation-in-part of application Ser. No. 156,012, filed Aug. 25, 1971, and now abandoned, for Multipurpose Ski Tool.

BACKGROUND OF THE INVENTION

This invention relates to a new and novel multipurpose ski tool.

Skiers frequently have to make binding adjustments and such adjustments must be made at times when they are not near a base where a tool such as a screwdriver is available. It is not practical to carry a screwdriver because of the danger and inconvenience. Coins sometimes are used but are not only difficult to extract from parka pockets but are also difficult to manipulate with gloves. Furthermore, very little torque can be supplied with a coin.

It is also frequently desirable to accomplish scraping functions such as to remove excess wax from the bases of skis or to remove packed snow from the soles of ski boots. Also, it is desirable or necessary to accomplish other scraping functions such as cleaning car or snowmobile windshields.

SUMMARY OF THE INVENTION

According to the present invention and forming a primary objective thereof, a multipurpose tool is provided which is of a construction to serve as a screwdriver and as a scraper.

A more particular object of the present invention is to provide a tool of the type described having a metal screwdriver bit on its upper end, a pair of metal side edges capable of serving either as a screwdriver or a metal scraper, and a plastic bottom edge capable of serving as a plastic scraper.

Another object is to provide a tool of the type described which has a novel structural arrangement wherein a metal insert is secured to a plastic body portion and projects from the top and sides to form the screwdriver bit and metal side edges, the bottom edge of the body portion serving as the plastic scraper.

Still another object of the invention is to provide a tool of the type described which is shaped so that the skier can get a good grip thereon and can apply torque as necessary, and furthermore so that it can be readily and safely carried on his person.

The invention will be better understood and additional objects and advantages will become apparent from the following description taken in connection with the accompanying drawings which illustrate a preferred form of the device.

DETAILED DESCRIPTION OF A PREFERRED EMBODIMENT

Figure 1:
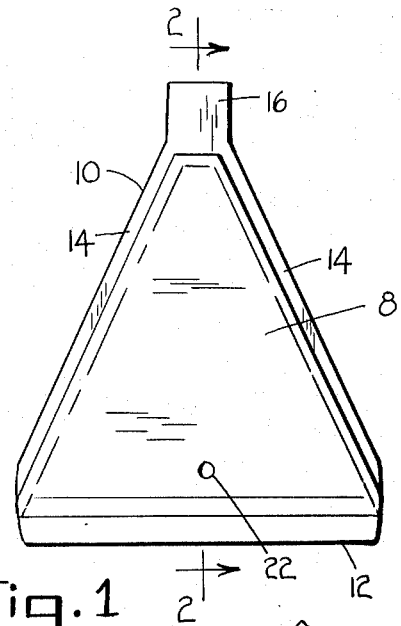
FIG. 1 is an elevational view of the multipurpose ski tool of the present invention.
Figure 2:
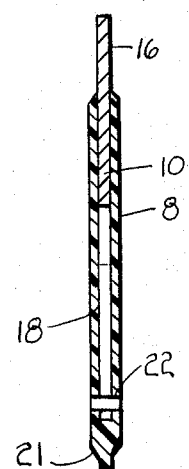
FIG. 2 is a sectional view of the tool, taken on the line 2—2 of FIG. 1.

Referring first to FIG. 1, the tool comprises a body portion 8 and an insert 10. The body portion has flat face surfaces and is constructed of a non-metallic substance having insulating qualities so that not only can it be handled in cold weather without sticking to the fingers or gloves but also is comfortable to handle. The body portion can for example be constructed of plastic such as a plastic having the characteristics of Plexiglass. The insert 10 is constructed of metal and can comprise a suitable stainless grade of steel or a suitable metal plated with zinc, cadmium, copper, nickle or chromium to keep it from rusting. It must necessarily be of sufficient structural strength to serve screwdriver and scraping functions.

In general, the tool has a bottom plastic edge 12, side metal edges 14, and a top metal screwdriver tip 16. In a preferred construction, the tool is substantially triangular in shape with the screwdriver tip 16 being at the apex of the triangle.

Figure 3:
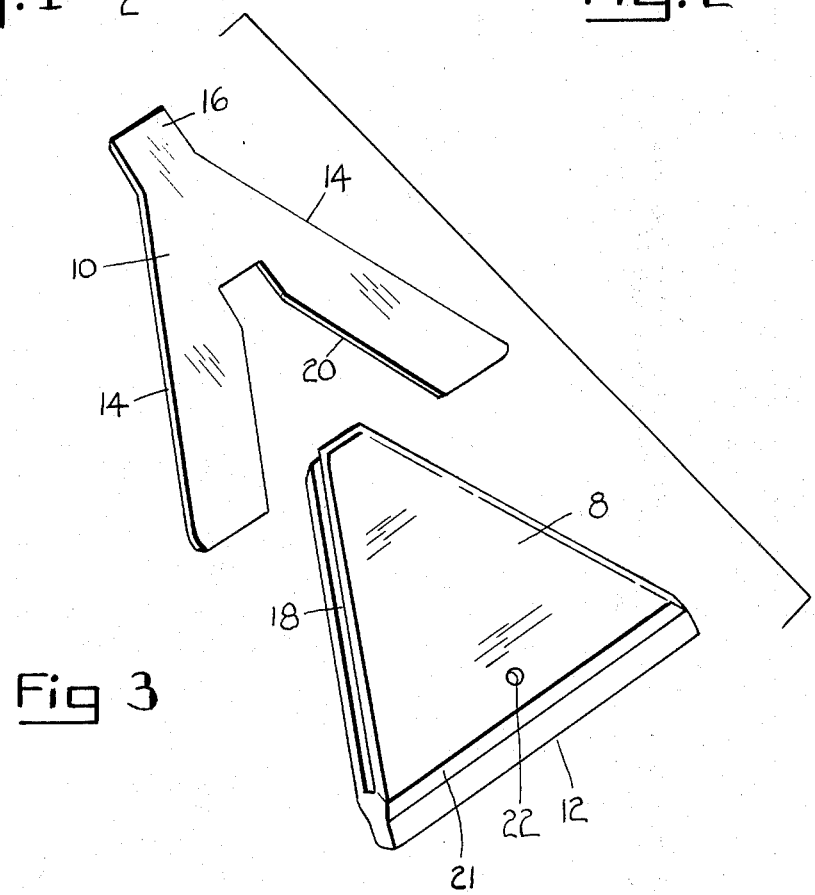
FIG. 3 is an exploded view of the tool showing the two parts that make up the tool.

To form the structure so as to provide a metal screwdriver tip 16, metal side edges 14, and a plastic bottom edge 12, the body portion 8 has a slot 18, FIG. 3, extending down from the top and opening through the sides. This slot terminates short of the bottom and is of a width to receive the insert. The insert preferably is of the shape shown in FIG. 3, having a bottom notch portion 20 so as to use a minimum of metal. The shape and dimension of the insert and body portion 8, however, are such that when the insert is disposed in the body portion, the tip thereof projects sufficiently at the top to form the metal screwdriver bit 16 and the sides project sufficiently laterally to form the metal side edges 14, FIG. 1, for use as a screwdriver bit or as metal scrapers.

The body portion 8 is notched or narrowed at 21 at the bottom to form the bottom scraping edge 12.

The body portion 8 can be adhesively secured to the metal insert by any suitable adhesive, or if desired the plastic can be injection molded onto the insert in a well known manner. It is important that the plastic body portion comprise the principal body area of the tool so that the skier will not have to grasp metal.

The present tool thus provides a metal screwdriver bit 16, metal side edges 14 which may serve as a screwdriver or as scraping edges, and a plastic bottom edge 12 which may serve as a scraping edge. The three screwdriver edges are capable of adjusting the majority of bindings. The edges 14 can be used for scraping when it is desired that a metal scraping edge be used and the edge 12 can be used for scraping when a plastic scraping edge is desired, such as for scraping excess wax from the bases of skis. The tool of course has other uses related to skiing, such as removing packed snow from ski boots as well as scraping snow and ice from car or automobile windshields.

The present tool is pocket size and can be safely carried on the person. It is easy to grasp even with gloves on and when grasped, a good torque or scraping force can be achieved. Very little metal is exposed and the gloves or fingers will not stick to it. An aperture 22 is provided in the body portion for attachment of a carrying cord if desired. The body portion can be molded of a bright color to make it easy to find if dropped in the snow.

It is to be understood that the form of my invention herein shown and described is to be taken as a preferred example of the same and that various changes in the shape, size and arrangement of parts may be re-

Having thus described my invention, I claim:

1. A ski tool comprising
   a. a body portion of non-metallic heat insulating substance such as plastic,
   b. said body portion having flat face surfaces serving as non-metallic hand gripping surfaces,
   c. a first end edge on said body portion capable of serving as a non-metallic scraping edge,
   d. an insert consisting of a flat metallic plate having a first ski binding screwdriver bit at one end and a second ski binding screwdriver bit on at least one side thereof,
   e. said insert being secured within said body portion such that the screwdriver bit at the said one end projects from the body portion at the end of the latter opposite from the said frist end edge and the screwdriver bit on the one side projects from a side of the body portion.

2. The ski tool of claim 1 wherein said insert projects from both sides of said body portion to provide ski binding screwdriver bits on each side, said tool being substantially triangular in shape with said first edge comprising the base of the triangle, the said first screwdriver bit comprising the apex of the triangle and the side screwdriver bits comprising the sides of the triangle.

* * * * *